United States Patent [19]

Schlüter

[11] 3,862,578

[45] Jan. 28, 1975

[54] DEVICE FOR TESTING AND REPEAT CHECKING OF PRESSURE CONTAINERS

[75] Inventor: Heinz Schlüter, Nurnberg, Germany

[73] Assignee: Maschinenfabrik Augsburg-Nurnberg Aktiengesellschaft Werk Nurnberg, Nurnberg, Germany

[22] Filed: Oct. 25, 1972

[21] Appl. No.: 300,665

[30] Foreign Application Priority Data
Oct. 29, 1971 Germany............................ 2154015

[52] U.S. Cl............. 73/432 R, 73/67.8 S, 176/19 R
[51] Int. Cl............................................ G21c 17/00
[58] Field of Search........... 73/432, 67.8 S, 71.52 L; 176/19 R, 19 LD; 250/360, 521

[56] References Cited
UNITED STATES PATENTS

| | | | |
|---|---|---|---|
| 3,519,363 | 7/1970 | Ritcher.............................. | 356/241 |
| 3,664,922 | 5/1972 | Diwinsky........................... | 176/19 R |
| 3,780,571 | 12/1973 | Wiesner............................. | 73/67.8 S |

FOREIGN PATENTS OR APPLICATIONS
2,053,105   6/1971   Germany

Primary Examiner—Jerry W. Myracle
Assistant Examiner—Denis E. Corr
Attorney, Agent, or Firm—Walter Becker

[57] ABSTRACT

An apparatus for testing the inside of a pressure container which includes a post on the axis of the container moveable axially along the axis and also rotatable on the axis. First testing means pivotally mounted on one end of the post is adapted to sweep over a closed end of the container and perform tests thereon. Second testing means is supported on the ends of a longitudinally expansible and contractable beam rotatably mounted on the post near the one end thereof. A centering device on the post engages the container and supports the post radially. Outside the container a bridge supports the post and the testing means on the post and the post are adapted for being manipulated by controls on, or near, the bridge.

23 Claims, 7 Drawing Figures

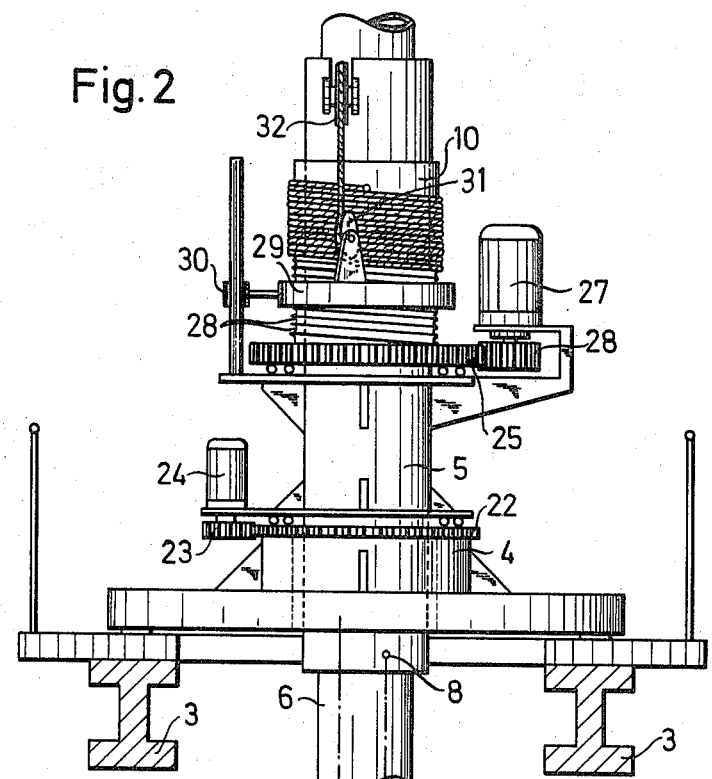
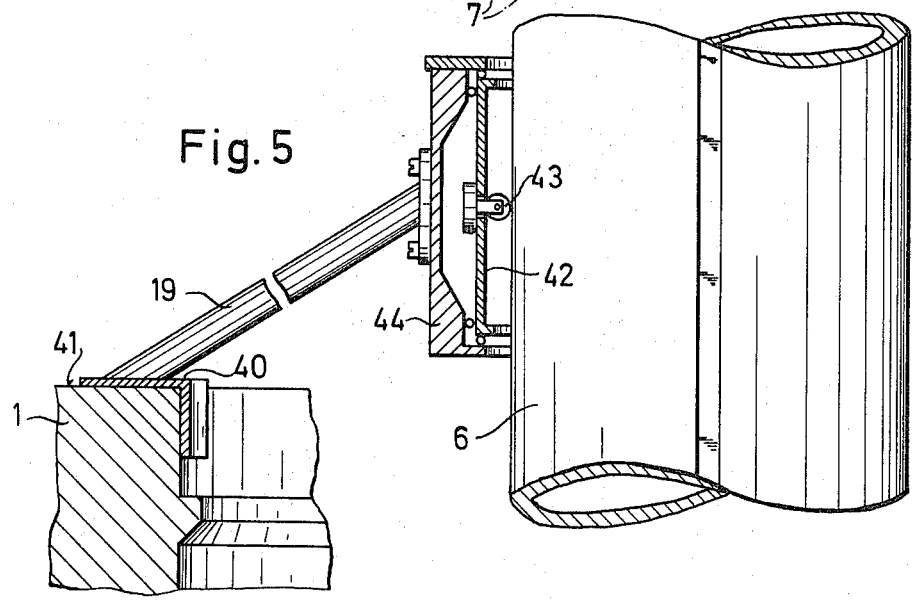

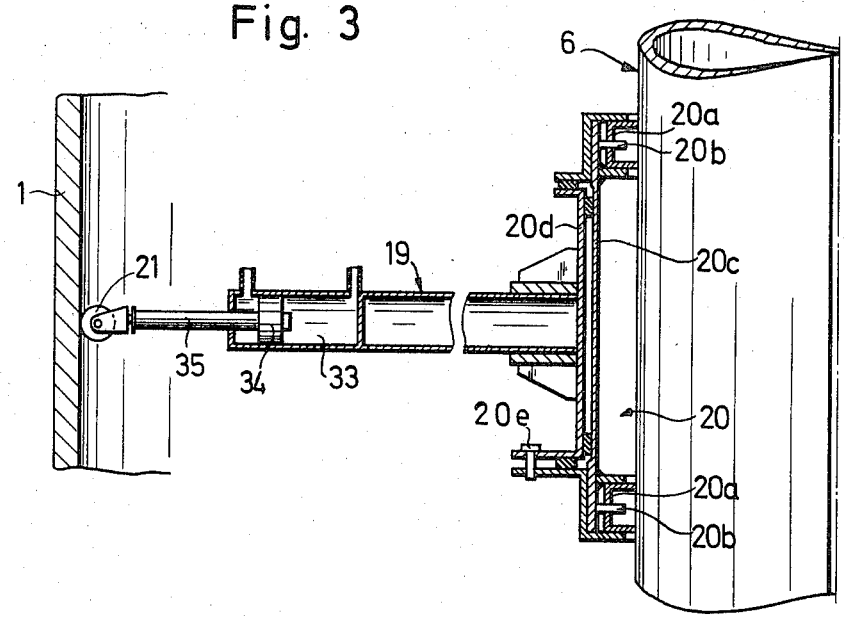
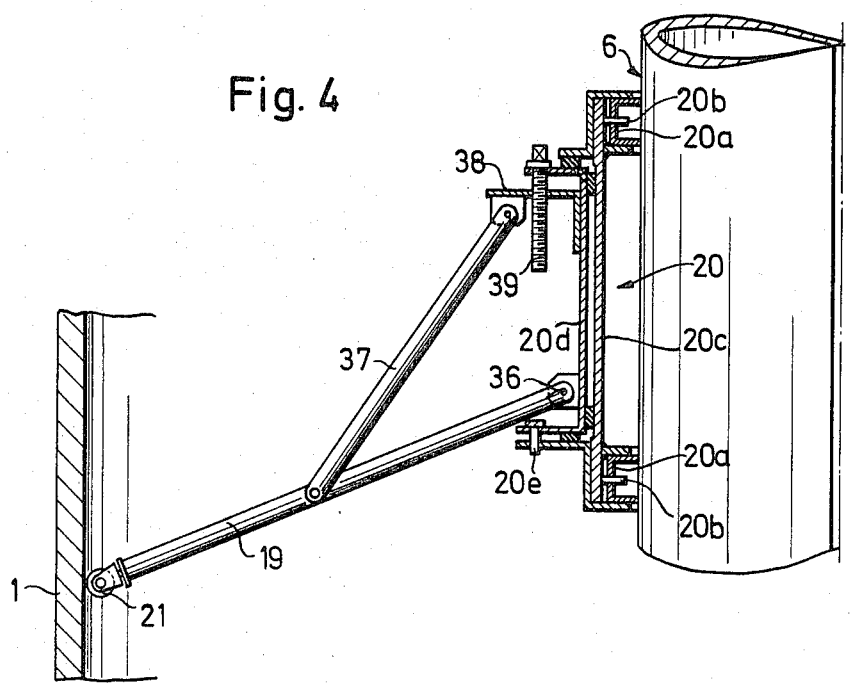

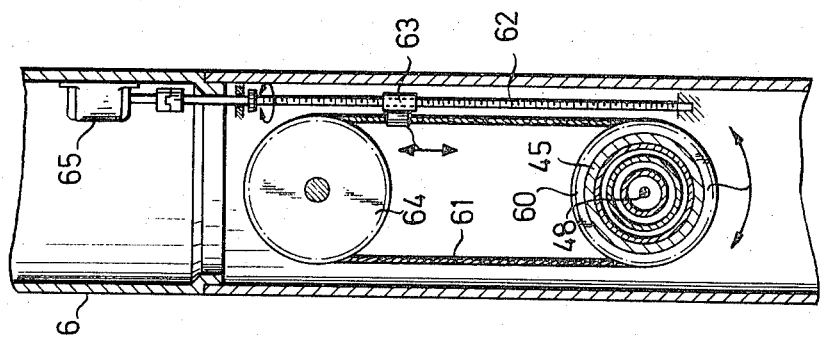

DEVICE FOR TESTING AND REPEAT CHECKING OF PRESSURE CONTAINERS

The present invention relates to a device for carrying out tests and repeat checks in connection with the inner surfaces of pressure containers, especially of pressure water reactors, which device comprises a post which is adapted to be introduced into the pressure container and is also adapted to be radially supported, the post being held in axial direction by a bridge above the pressure container while structural elements equipped with a test head are movably provided on the post.

With pressure containers and especially with pressure water reactors it is, for assuring sufficient safety, not only necessary that such pressure containers and pressure water reactors after their completed manufacture are checked as to possible flaws in their structure or in their welding seams, but it is also necessary that in the course of the operation they are checked again at certain time intervals as to newly developed damages so that such damages can be repaired in time or the container can be taken out of operation in time. Such checks are termed repeat checks.

Inasmuch as such containers are generally accessible from the outside only under difficulties, a checking from the inside of the walls is preferred to an ever increasing degree primarily because the required manipulating devices can be designed considerably simpler. The checking from the inside, for instance, of a pressure water reactor includes the checking of the cylindrical container walls, the checking of the in most instances curved bottom, the checking of the inlets and outlets for the respective liquid or the like and, above all, the checking of the merging areas to the inlets and outlets the shape of which or curve of penetration is frequently very difficult to feel because they are three dimensional. These individual container parts must be checked by a separate device each which in itself, due to the great number of such devices and the cumbersome assembly, makes it a rather expensive and time consuming arrangement. Furthermore, the water-filled containers have to be emptied first which fact further contributes to the expenses and makes the checking more difficult.

It is, therefore, an object of the present invention to provide a device or to further improve a device of the above referred to fundamental structure so that it will be possible by means of such improved device to check the entire inner surfaces of differently shaped containers of different sizes including their inlet and outlet connections and their welding seams without the necessity of emptying the containers.

It is another object of this invention to provide a device as set forth in the preceding paragraph which will permit the carrying out of all individual checks while only once installing the device on the container so that all individual checks can be made directly one after the other or at least some even simultaneously.

These and other objects and advantages of the invention will appear more clearly from the following specification in connection with the accompanying drawings, in which:

FIG. 1 diagrammatically illustrates a longitudinal section through a pressure water reactor with built-in device according to the invention.

FIG. 2 illustrates the mounting of the post according to FIG. 1 but on a larger scale than that of FIG. 1.

FIG. 3 represents a longitudinal section through a centering star according to the invention.

Figure 1:
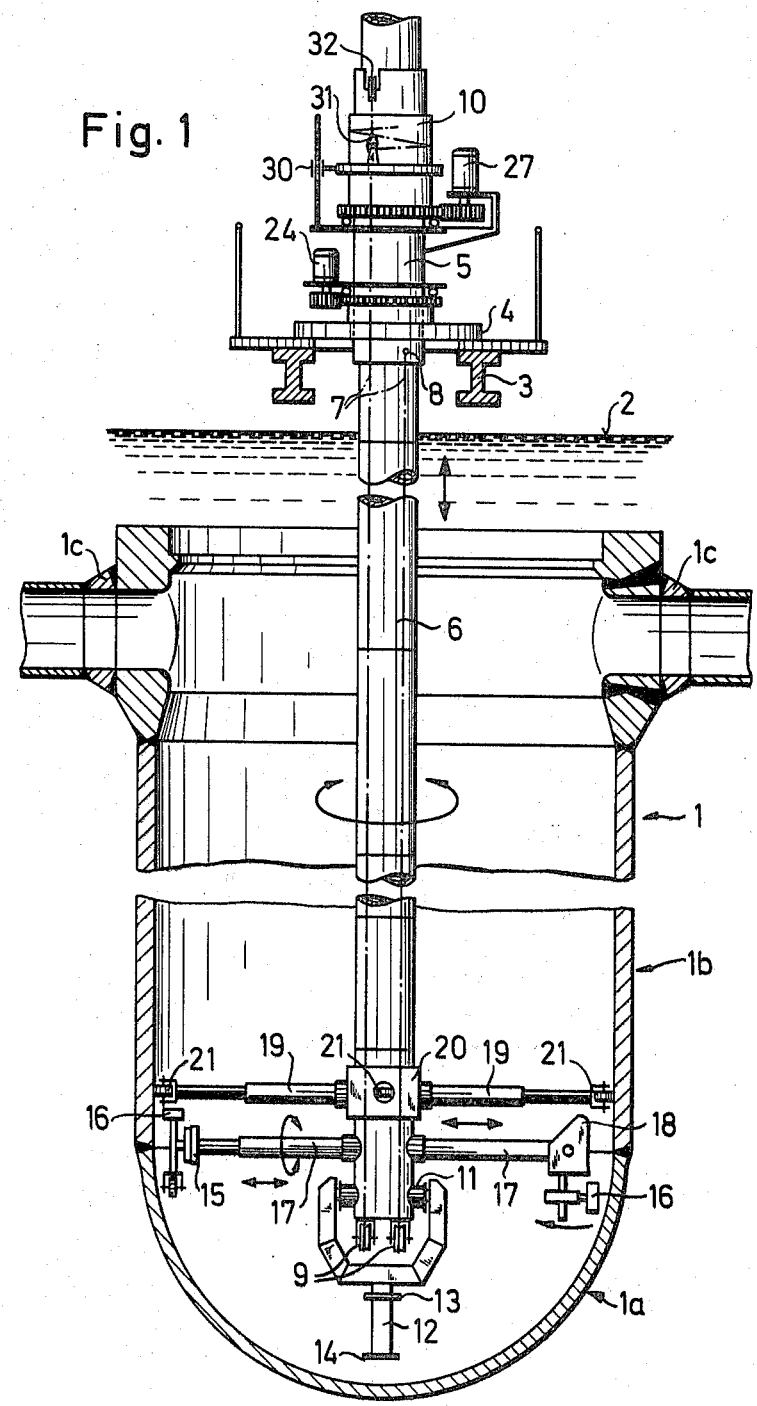

FIGS. 4 and 5 respectively illustrate further designs of centering stars and arms according to the invention.

FIGS. 6 and 7 diagrammatically illustrate the construction of the crosspiece.

The device according to the present invention is characterized primarily in that the post is rotatably and axially displaceably journalled in a support connected to a bridge and that the post is by means of a centering star comprising at least three arms adapted to be centrally adjusted in the pressure container and held therein during the checking operation. The invention is furthermore characterized in that at the lower end of the post there is provided an extension or crosspiece known per se and somewhat spider-leg-shaped which is pivotable about a transverse axis. The device according to the present invention is also characterized in that in addition to the crosspiece at least one beam is provided which is arranged transverse to the longitudinal axis of the post. The beam, while being passed through the post, is rotatably journalled therein and, when viewed from the post, is radially telescopically adjustable and has its free ends equipped with at least one connecting flange for a further checking head. Finally, the arrangement is such that all units in the pressure container are adapted to be remote-controlled from the bridge.

Such a design will make it possible, after the device has once been centrally installed, to check in any case all areas of the container wall without the necessity of effecting further adjustments. The spider-leg-shaped crosspiece serves for feeling the cylindrical wall and the curved bottom, whereas the radial beam, depending on arrangement of the test head, is provided primarily for checking the inlet and outlet connections and their merging areas with the container.

More specifically, according to the present invention, it is suggested to arrange the post axially displaceably in a neck journal, and to rotatably mount the neck journal by means of a drive motor connected thereto together with the drive motor in a support. The axial displacement of the post is effected by a tackle or cable line which has one end connected to the neck journal and has its other end passing over reversing rollers at the lower end of the post and leading to a winch drum mounted on the neck journal. Expediently, the winch drum which is rotatable about the longitudinal axis of the post is mounted on the neck journal and is driven by a motor through the intervention of a gear transmission. This arrangement has proved particularly space saving. In order to assure a proper winding-up and winding-off of the cable line, a ring nut engages the cable grooves of the winch drum and is non-rotatable relative to the neck journal while a reversing roller precisely feeding the cables into the cable grooves of the drum is connected to the ring nut. The post itself is composed of a plurality of individual sections. The centering star is, in conformity with the present invention, by means of a clamping device displaceable in axial direction and is arrestable on the post. The clamping device comprises primarily clamping rings surrounding the post, an inner bearing ring positively connected to the clamping rings, and an outer bearing ring rotatably mounted on the inner bearing ring, centering arms being connected to the outer bearing ring. By locking bolts which are adapted to be inserted from the bridge, it is possible firmly to connect the outer bearing ring to the inner bearing ring. The centering arms extend radially outwardly and have their free ends preferably provided with rollers by means of which they are supported on the container wall. For radially adjusting the outward projection of the centering arms, hydraulically or pneumatically operable cylinder piston assemblies are arranged in the centering arms.

According to a modification of the present invention, the radially outwardly projecting centering arms are slightly inclined downwardly and are pivotally arranged on the outer bearing ring. At the same time the centering arms are by means of a lever linked to a sliding ring which is displaceable on the outer bearing ring. The sliding ring is by means of spindles from the bridge pulled upwardly so as uniformly to press the centering arms or the running rollers against the container walls. In this way the post will automatically and precisely be centered in the container. During the checking operation, the centering arms may with the outer bearing ring of the clamping device remain in their respective position, whereas the inner bearing ring by means of the clamping rings turns with the post. The rollers will become active only in response to an axial displacement of the post. If, however, the outer bearing ring is by the latching bolt connected to the inner bearing ring, also the centering arms will rotate together with the post while the rollers roll on the container wall.

To make it unnecessary to adjust the centering star during operation of the device a plurality of times to a higher or lower position, there is also suggested a further modification according to which the centering arms extend radially outwardly but at an incline in downward direction and are rigidly connected to an outer bearing ring while their free ends are respectively provided with a centering angle piece by means of which the centering star is placed upon the upper rim of the pressure container to thereby precisely centrally to adjust the post. Inasmuch as the centering arms have no running rollers, the centering star must neither during the rotation nor during the axial displacement of the post be coupled to the latter. Therefore, it is further suggested to arrange the outer bearing ring rotatably on the inner bearing ring and to provide on the inner circumference of the inner bearing ring a plurality of rollers pointing in the direction of displacement of the post for an easier displacement and radial guiding of the post.

As to the spider-leg-shaped crosspiece, the latter may by an adjustment and a subsequent arresting of a joint be adapted to the respective shape of the container walls to be tested or checked. The pivotal movement about the transverse axis is necessary for checking the curved container bottom and is effected by means of a cable drive in the post which cable drive cooperates with a spindle drive operable from the bridge. Instead of a cable drive it is also possible to use a gear drive provided the structural conditions permit the employment of such gear drive.

The boom vertically arranged with regard to the post is, in conformity with a further development of the invention, provided at its opposite ends with a connecting flange for a test head and is at one end advantageously equipped with a test head support which is adapted resiliently inwardly to pivot up to 90° in the direction of the longitudinal axis of the boom. This test head support is particularly suited for testing the inlet edges and for checking the container walls in the region of the pipe connections because it adapts itself well to the respective shape of the walls.

The radial boom itself consists of a two-link telescopic pipe which is displaceably journalled in a guiding pipe of the post and in which there is provided a hydraulically or pneumatically operable lifting piston drive for increasing the radial projection of the boom. The lifting piston drive can be acted upon only unilaterally and moves the boom simultaneously to both sides inasmuch as the piston rod is connected to one connecting flange whereas the cylinder is connected to the other connecting flange. The pulling-in of the boom is effected against the pressure in the drive for the lifting piston by means of electro-drives which respectively through a spindle in the post and a cable line cooperating therewith are connected to the connecting flanges. In view of this arrangement it will be possible to move one side of the radial boom outwardly to a greater or lesser extent, in other words, to cause only one side of the boom to work.

The rotation of the radial boom about its longitudinal axis is effected in conformity with the invention by a cable, belt or chain drive in cooperation with a spindle drive driven by a motor while the cable drive acts upon the guiding pipe and rotates the same together with the boom. In order to be able to test and check also the inlet edges of the connecting pipes which with round containers are three-dimensional and to be able to guide the test head accordingly, it is suggested in conformity with a further development of the invention to provide a control disc on the boom which control disc is exchangeable and is adapted to the respective desired movement. During the rotation of the boom, a roller connected to the outer pipe of the boom rolls along the control disc and causes the telescopic pipe to move outwardly to a greater or lesser extent. All movements of the test heads are controlled in a manner known per se by a remote control so that the operator will always be sure, when carrying out an underwater test, of which area of the container is being checked at the respective time.

Referring now to the drawings in detail, FIG. 1 shows an opened pressure container 1 for a pressure water reactor which has a substantially arched bottom 1a, a cylindrical container wall 1b and a number of connections 1c for the cooling medium for withdrawing heat from the core. Generally the pressure container 1 is located below water level, the water level being approximately at the line 2. Above the water level 2 there is provided a bridge 3 for assembly purposes. In a support 4 mounted on the bridge 3 there is a neck bearing 5 which is rotatably arranged and in which there is displaceably mounted a hollow post 6 composed of individual sections. The post 6 is freely suspended and extends into the pressure container 1 and, as shown in FIG. 1, is displaceably held by a cable line 7 with two loops. The cable line 7 has one end 8 connected to the neck bearing 5 and passes over deviating rollers 9 at the lower end of post 6 to a winch drum 10 arranged on the neck bearing 5. At the lower end of post 6 there is rotatably mounted a transverse shaft 11 on which the spider-leg-shaped crosspiece 12 is connected. The transverse shaft 11 is through the intervention of a known cable drive and spindle drive (not shown) pivotable by means of a motor arranged in the post after the crosspiece 12 in its joint 13 has been adjusted in conformity with the container wall to be checked. At the free end of the crosspiece 12 there is provided a flange 14 for receiving a test head. The crosspiece 12 serves primarily for checking the bottom 1a of the cylindrical container wall 1b.

Above the crosspiece 12 in the post 6 there is rotatably mounted a radially extending beam 17 which is equipped with connecting flanges 15 for test heads 16. At the right-hand end of the beam 17 ahead of the test head 16 there is interposed a test head carrier 18 which is resiliently pivotable inwardly in the direction of the arrow by an angle of up to 90°. The test head carrier 18 is intended primarily for checking the welding seams of the connections 1c from the container wall on. The test heads 16 arranged on the beam 17 are suited primarily for checking the connections 1c from the connection wall on and, therefore, may also be moved correspondingly outwardly.

Finally, a centering star is displaceably and arrestably arranged on post 6. This centering star is composed of a plurality of radially arranged centering arms 19 adjustable as to their projection, and a clamping device 20. By means of the centering star it is possible to precisely centrally position the post 6 in the container and to hold the post in the central position. During the checking operation according to the specific showing in the drawing, the centering arms 19 are equipped with rollers 21 by means of which they roll on the container wall.

FIG. 2 shows that the support 4 has a gear ring 22 which meshes with a pinion 23 of a drive motor 24 connected to the neck bearing 5. By means of the drive motor 24 the neck bearing 5 together with the post 6 is rotatable relative to the support 4. The neck bearing 5 serves as bearing means for the winch drum 10 while the rotation of the drum 10 is effected by means of a gear ring 25, a pinion 26 and a motor 27 likewise mounted on the neck bearing 5. A ring nut 29 engages the drum grooves 28 of the drum 10, the nut 29 being secured against accidental turning by guiding means 30. Connected to the ring nut 29 is a deviating roller 31 which deviates the cable line 7 by 90°, line 7 passing over a roller 32 and coming from above brings about a displacement of post 6. Due to the cooperation of roller 31 with ring nut 29 moving upwardly or downwardly, depending on the direction of rotation of drum 10, cable line 7 is precisely guided into the cable grooves 28 on drum 10.

FIG. 3 illustrates on a larger scale than that of FIG. 1 the centering star 19. As will be seen from FIG. 3, each centering arm 19 has built-in a hydraulically or pneumatically operable cylinder piston assembly 33, 34. The piston 34 is, when subjected to fluid under pressure, moves outwardly and by means of the piston rod 35 presses the roller 21 against the pressure container 1. The clamping device 20 is composed primarily of two clamping rings 20a extending around the post 6 which rings 20a through the intervention of bolts or rings 20b are positively connected to an inner bearing ring 20c. Rotatably journalled on the inner bearing ring 20c is an outer bearing ring 20d having the centering arms 19 connected thereto. If during the checking operation, i.e. during the rotation of the post 6, the centering arms 19 with their rollers 21 are likewise to rotate, the outer bearing ring 20d is by a locking bolt 20e firmly connected to the inner bearing ring 20c.

The centering arm 19 according to FIG. 4 is rigid in itself but is at 36 pivotally connected to the outer bearing ring 20d. Linked to the centering arm 19 is one end of a lever 37 the other end of which is linked to a slide ring 38 which is displaceable on the outer bearing ring 20d. The slide ring 38 is by means of a plurality of spindles 39 adjustable upwardly and downwardly, the spindles being operable individually or together from the bridge 3. As a result thereof, all centering arms 19 linked to the slide ring 38 are uniformly pressed against the pressure container 1 or lifted off the pressure container 1. The construction of the clamping device 20 is the same as that described in connection with FIG. 3.

FIG. 5 shows a centering arm 19 of a somewhat different centering star which is likewise able precisely to center the post 6. The free ends of the centering arms 19 have connected thereto centering angle pieces 40 which are mounted on the upper rim 41 of the pressure container 1. Post 6 is secured by an inner bearing ring 42 having connected thereto a plurality of rollers 43 which are distributed over the circumference of ring 42, the rollers 43 engaging the post 6. The rollers 43 serve for an easy displacement of the post 6 in axial direction. Easily rotatably arranged on the inner bearing ring 42 is an outer bearing ring 44 having the centering arms 19 connected thereto.

FIG. 6 shows that the beam 17 which is arranged perpendicularly with regard to the post 6 is composed of two pipes or tubes 17a and 17b which are telescopically displaceably arranged one within the other and which are respectively connected to a connecting flange 15 and are displaceably mounted in a guiding pipe 45 which is rotatably arranged in the post 6. Within the tubes 17a and 17b there is provided a hydraulically or pneumatically unilaterally operable lifting piston drive the cylinder 46 of which is connected to one connecting flange 15 whereas its piston 47 is by means of the piston rod 48 connected to the oppositely located connecting flange 15. The lifting piston drive is always through a preceding pressure control valve 49 under the same pressure and serves solely for increasing the radial projection of the beam 17. Furthermore, cups 50 are arranged on the connecting flanges 15 and have respectively connected thereto cable lines 51 which pass over deviating rollers 52 in post 6 and movable rollers 54 connected to a spindle nut 53 and have their other end anchored to the post 6. Each spindle nut 53 is displaceable on a spindle 56 coupled to a drive 55 and arranged in the post 6 whereby the cable lines 51 may be more or less tensioned. The cable lines 51 and the spindle drives 52, 56 work against the pressure in the lifting piston drive 46, 47 and serve for moving the radially extending beam 17 inwardly. By hauling in only one cable line 51 and releasing the other cable line 51, it is possible to displace the beam 17 also unilaterally with regard to the post. For fixing the cups 50 with the arresting of the cable lines 51 during the rotation about the axis of beam 17, there is, according to FIG. 6, provided an additional guiding means 57.

For checking or testing the inlet edges of the connections, as shown on the right-hand side of FIG. 6, a three-dimensional movement of the test head 16 is necessary. To this end, a correspondingly designed control disc 58 is exchangeably arranged on post 6 while a roller 59 connected to the outer telescopic pipe tube 17a is adapted to roll on the control disc 58.

FIG. 7 shows the drive for turning the guiding pipe 45 and the radially extending beam 17. Approximately in the center of post 6 the guiding pipe 45 carries a cable roller 60 for a cable drive 61 which is connected to a spindle nut 63 moving upwardly and downwardly on a spindle 62 and passes over a further clamping roller 64. When the spindle nut 63 is displaced by a motor 65 operatively connected to the spindle 62, the guiding pipe 45 will always be rotated and consequently also the beam 17. It may be added that instead of a cable drive also any other suitable drives, such as a belt drive or a chain drive may be employed.

It is, of course, to be understood that the present invention is by no means limited to the particular showing in the drawings but also comprises any modifications within the scope of the appended claims.

What is claimed is:

1. In combination with a device for conducting tests on the inside of a pressure container having an axis and open at one axial end and closed at the other axial end; a post arranged coaxially with said container, bridge means supporting said post and including means for moving said post on the axis of the container and means for rotating said post, adjustable centering means engaging said post and engageable with the wall of said container to support the post in the radial direction, first support means on one end of said post pivotal thereon about an axis perpendicular to the axis of the post and adapted for supporting first testing means to test the closed axial end of said container, and second support means in the form of a beam extending through said post near said one end thereof in a direction perpendicular to the axis of the post, said beam being expansible and contractable in the radial direction of the post and being rotatable in said post about an axis perpendicular to said axis of the post, said beam having means at the ends for further supporting second test means for testing the longitudinal wall of said container, and means for controlling from the bridge the adjustment of said centering means and the pivotal movement of said first support means and the expansion and contraction and the rotation of said beam for positioning of the test means thereon.

2. In a device for conducting tests on the inside of a pressure container having an axis and open at one axial end and closed at the other axial end; a post arranged coaxially with said container, bridge means supporting said post and including means for moving said post on the axis of the container and means for rotating said post, adjustable centering means engaging said post and engageable with said container to support the post in the radial direction, first support means on one end of said post pivotal thereon about an axis perpendicular to the axis of the post and adapted for supporting first testing means to test the closed axial end of said container, and second support means in the form of a beam extending through said post near said one end thereof in a direction perpendicular to the axis of the post, said beam being expansible and contractable in the radial direction of the post and being rotatable in said post, said beam having means at the ends for supporting second test means for testing the longitudinal wall of said container, the adjustment of said centering means and the pivotal movement of said first support means and the expansion and contraction of said beam and the rotation thereof being adapted to be remotely controlled from said bridge means, said centering device comprising an inner bearing ring adapted to be clamped about said post, an outer bearing ring rotatable on said inner bearing ring, and arms connected to said outer bearing ring and projecting radially therefrom, and means for selectively locking said outer bearing ring to said inner bearing ring and adapted for being remotely controlled from said bridge means.

3. A device according to claim 2 in which said bridge means includes a sleeve nonrotatably surrounding said post, a support on the bridge means rotatably supporting said sleeve, and a motor for driving said sleeve in rotation on said support.

4. A device according to claim 3 which includes cable means extending axially in said post and adjustably connected to said sleeve for adjusting said post axially in said sleeve.

5. A device according to claim 4 which includes a cable drum rotatably supported adjacent said sleeve and connected to said cable.

6. A device according to claim 5 in which said cable drum is coaxial with said sleeve and is supported thereon, and a motor for driving the cable drum in rotation on said sleeve.

7. A device according to claim 2 in which said means at the ends of said beam comprise flanges.

8. A device according to claim 2 in which said means at the ends of said beam comprise carriers pivotally connected to the beam on axes perpendicular to the axis of the beam and adapted for supporting test means.

9. A device according to claim 2 in which said beam comprises telescopically engaged first and second portions, and a tubular support surrounding said portions and rotatable in said post, said portions being axially moveable in said tubular support.

10. A device according to claim 9 which includes fluid operable means for moving said portions outwardly on said post and electrically operable means for moving said portions inwardly on said post.

11. A device according to claim 10 in which said first and second portions comprise the cylinder and piston respectively of a fluid motor forming said fluid operable means.

12. A device according to claim 10 in which said electrically operable means comprises electric motor means in said post, and cable means driven thereby and connected to said first and second portions.

13. A device according to claim 12 in which said motor means comprises a motor for each of said portions, a threaded spindle driven by each motor, a nut on each spindle, said cable means comprising a cable engaging each nut, a deviating roller in the column for each cable, each cable passing over the respective deviating roller and outwardly along the respective said portion and being connected to an outer region of the respective portion.

14. A device according to claim 9 in which said tubular support nonrotatably engages said first and second portions, coplanar pulleys on said tubular support and in said post and a flexible drive element entrained thereabout, and a drive motor in the post drivingly engaging said drive element for rotating said tubular support in said post.

15. In a device for conducting tests on the inside of a pressure container having an axis and open at one axial end and closed at the other axial end; a post arranged coaxially with said container, bridge means supporting said post and including means for moving said post on the axis of the container and means for rotating said post, adjustable centering means engaging said post and engageable with said container to support the post in the radial direction, first support means on one end of said post pivotal thereon about an axis perpendicular to the axis of the post and adapted for supporting first testing means to test the closed axial end of said container, and second support means in the form of a beam extending through said post near said one end thereof in a direction perpendicular to the axis of the post, said beam being expansible and contractable in the radial direction of the post and being rotatable in said post, said beam having means at the ends for supporting second test means for testing the longitudinal wall of said container, the adjustment of said centering means and the pivotal movement of said first support means and the expansion and contraction of said beam and the rotation thereof being adapted to be remotely controlled from said bridge means, said bridge means including a sleeve nonrotatably surrounding said post, a support on the frame means rotatably supporting said sleeve, and a motor for driving said sleeve in rotation on said support, cable means extending axially in said post and adjustably connected to said sleeve for adjusting said post axially in said sleeve, a cable drum rotatably supported adjacent said sleeve and connected to said cable, said cable drum being coaxial with said sleeve and is supported thereon, and a motor for driving the cable drum in rotation on said sleeve, said drum having a helical cable groove thereon, a nonrotatable ring nut engaging said groove, and a deviating roller on the ring nut for guiding the cable to and from said groove.

16. A device according to claim 15 in which said post comprises a plurality of sections connected together in end to end relation.

17. A device according to claim 15 in which said centering means is axially adjustable along said post.

18. A device according to claim 15 in which said centering device comprises an inner bearing ring adapted to be clamped about said post, an outer bearing ring rotatable on said inner bearing ring, and arms connected to said outer bearing ring and projecting radially therefrom.

19. In a device for conducting tests on the inside of a pressure container having an axis and open at one axial end and closed at the other axial end; a post arranged coaxially with said container, bridge means supporting said post and including means for moving said post on the axis of the container and means for rotating said post, adjustable centering means engaging said post and engageable with said container to support the post in the radial direction, first support means on one end of said post pivotal thereon about an axis perpendicular to the axis of the post and adapted for supporting first testing means to test the closed axial end of said container, and second support means in the form of a beam extending through said post near said one end thereof in a direction perpendicular to the axis of the post, said beam being expansible and contractable in the radial direction of the post and being rotatable in said post, said beam having means at the ends for supporting second test means for testing the longitudinal wall of said container, the adjustment of said centering means and the pivotal movement of said first support means and the expansion and contraction of said beam and the rotation thereof being adapted to be remotely controlled from said bridge means, said centering means comprising at least three circumferentially spaced radial arms, and rollers on the free ends of said arms for engagement with the inside of the container being tested.

20. A device according to claim 19 in which said arms are telescopically adjustable, and fluid motor means for effecting said adjustment.

21. A device according to claim 19 in which said arms incline downwardly in the outward direction and are pivotally supported at the inner ends thereof, a ring member adjustable axially of said post, and links connecting the ring member to said arms for controlling the angularity thereof.

22. A device according to claim 19 which includes a bearing supporting said arms on said post, said arms inclining downwardly in the outward direction from said bearing, and angle members on the outer ends of said arms for engaging the rim of the container.

23. A device according to claim 22 in which said bearing comprises an outer part connected to said arms, an inner part surrounding said post, and rollers inside said inner part engaging said post and guiding said bearing and post relatively in the axial direction of said post.

* * * * *